United States Patent [19]

Kurata et al.

[11] 4,449,152

[45] May 15, 1984

[54] COPYING MACHINE

[75] Inventors: Masami Kurata; Fujio Moriguchi; Yoshiki Kikuchi; Haruhiko Moriguchi; Takashi Ohmori, all of Ebina, Japan

[73] Assignee: Fuji Xerox Co., Ltd., Tokyo, Japan

[21] Appl. No.: 329,468

[22] Filed: Dec. 10, 1981

[30] Foreign Application Priority Data

Dec. 10, 1980 [JP] Japan ............... 55-174069

[51] Int. Cl.³ .............................. H04N 1/22
[52] U.S. Cl. .................... 358/296; 358/286; 358/287; 358/288; 358/293; 358/303; 346/76 PH
[58] Field of Search ............... 358/287, 303, 304, 300, 358/298, 293, 286, 283, 256, 288, 296; 346/76 PH

[56] References Cited

U.S. PATENT DOCUMENTS

| | | | |
|---|---|---|---|
| 2,776,336 | 1/1957 | Clauer | 358/303 |
| 3,955,045 | 5/1976 | Ford, Jr. | 358/288 |
| 4,240,117 | 12/1980 | Wellendorf et al. | 358/293 |
| 4,303,936 | 12/1981 | Shaw | 358/287 |
| 4,329,021 | 5/1982 | Applegate et al. | 346/76 PH |

Primary Examiner—John C. Martin
Assistant Examiner—Edward L. Coles
Attorney, Agent, or Firm—Sughrue, Mion, Zinn, Macpeak & Seas

[57] ABSTRACT

A copying machine includes an optical sensor of the line scanning type for converting an image into electrical signals, and a thermal recording head controlled in accordance with the image signals. The platen moves with respect to the read unit and the read unit will read in both forward and reverse directions of the platen, and the magnification value can be varied. The total width of energized heating elements and the movement length and speed of the platen may be controlled in accordance with the size of the original. The total number of heating elements energized at any one time is limited, and the machine includes input and output terminals for sending image information externally and for receiving and recording image information other than directly from the read unit.

21 Claims, 6 Drawing Figures

COPYING MACHINE

BACKGROUND OF THE INVENTION

This application is related to concurrently filed and commonly assigned U.S. patent applications Ser. Nos. 329,466 and 329,467.

The present invention relates to a copying machine, and more particularly to a copying machine for producing a number of copies from one original.

Copying machines are classified into those using diazo photography, others using xerography, and so on. In the diazo photography, however, only one copy is obtained from one original so that operations have to be carried out for a desired number of copies in order to attain multiple copies, and there is also a restriction that the original has to be transparent or semitransparent. In xerography, on the contrary, a number of copies can be produced from one original, and there is no restriction upon the original. Nevertheless, xerography has disadvantages that a lot of power is required for fixing the developed image onto a sheet, the heat of the fixer has to be shielded, and that the size of the system as a whole is enlarged.

SUMMARY OF THE INVENTION

It is, therefore, an object of the present invention to provide a small-sized multi-sheet copying machine which has a low power consumption rate and which has a simple construction.

In order to attain this object, the present invention provides a copying machine comprising: a platen for arranging an original thereon; a read unit made movable back and forth relative to said platen for reading the picture image information of the original and for converting it into electrical picture signals; a thermal recording head having heating elements for generating heat in accordance with said electrical picture signals; means for conveying an ink donor member and a sheet of cut paper in juxtaposition to each other, while being in close contact under pressure, past the heating elements of said thermal recording head; and means for separating only the recorded paper from said ink donor member and for discharging the same. According to this copying machine, the original information, which is placed upon the platen, is read out line by line and is converted into series picture image signals by the action of the image sensor, and those picture image signals are subjected to a suitable picture image processing and are fed to the thermal recording head so that the leading end portion of the thermal recording fead generates heat in accordance with those picture image signals. By this heat, the donor web, which is sandwiched between the thermal recording head and the recording paper sheet, is heated so that a pigment is melted out of said donor web until it sticks to the recording paper sheet. Thus, the original information is copied line by line on the recording paper sheet. In case a number of sheets are to be copied, the image reading operations are performed in both the forward and backward strokes, and the image read out is recorded on the recording paper sheet by the action of the thermal recording head.

As a result, the present invention requires none of the photosensitive elements such as a drum or belt, which are one of the causes for the large size of conventional systems such as the xerographic system, so that the system as a whole can have its size reduced. Moreover, the present invention converts the picture image information of the original into electrical signals and processes these electrical signals so that it makes the communication with an external device possible. Still further, the present invention provides the picture signal processor at the outside so that the system as a whole has its size further reduced. In addition, the present invention makes the composition, deletion and transfer of the picture image possible and, since the image reading operations are performed in both the forward and backward strokes of the read unit, the present invention makes it possible to copy a number of sheets at a high speed.

BRIEF DESCRIPTION OF THE DRAWINGS

The present invention will now be described in more detail with reference to the accompanying drawings, in which.

DETAILED DESCRIPTION OF THE PREFERRED EMBODIMENT

Figure 1:
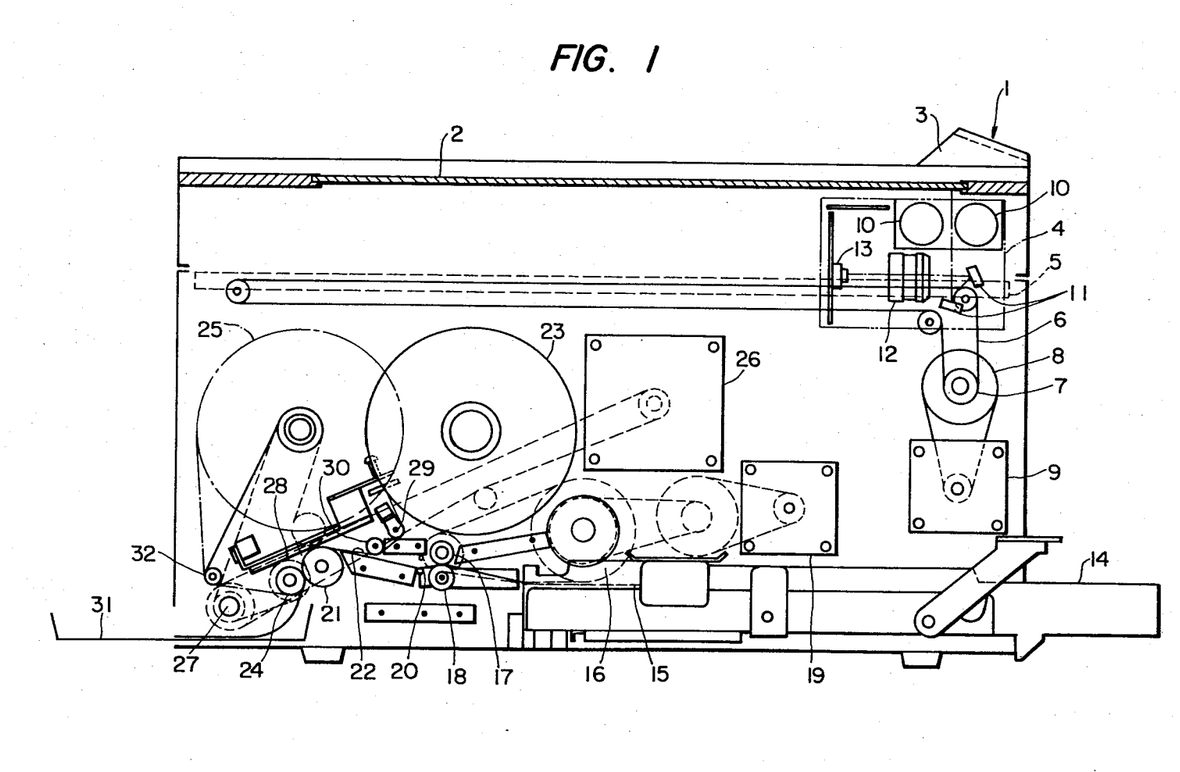
FIG. 1 is a schematic view showing the thermal recording type copying machine according to the present invention.

In FIG. 1, reference numeral 1 generally indicates an example of a copying machine, into which the features of the present invention are incorporated. At an upper portion of the copying machine 1, there is arranged a platen 2. This platen 2 is made of transparent glass or the like and is adapted to arrange an original thereon. The platen 2 is covered with a platen cover 3 so that it is prevented from being blotted with dust or the like and is protected from scratches and other damage. The platen 2 and platen cover 3 are hinged to the frame of the copying machine. Below the platen 2, there is arranged a read unit 4 which is attached to a read unit guide rail 5 such that it can move back and forth. These movements of the read unit 4 are effected through a drive belt 6, which is made to run on a drive shaft 7. To this drive shaft 7, there is fixed a drive roller 8, and the drive roller 8 is driven through a belt or the like by a step motor 9. When the step motor 9 is energized, the drive roller 8 and accordingly the drive shaft 7 are rotated so that these rotational motions are transmitted as linear motions through the drive belt 6 to the read unit 4. As a result, the read unit 4 stepwise moves to the right and left below the platen 2 along the rail 5.

The read unit 4 is composed of a pair of light sources 10, a pair of reflecting mirrors 11, a lens 12 and an image sensor 13. The light sources 10 are made to exend the width of the platen at right angles with respect to the moving direction of the read unit. The beams generated by the light sources 10 pass through slits which are formed at an upper portion of the read unit 4, and are reflected from the original, which is arranged on the platen, in accordance with the image information thereof so that they are converted into an optical image. This optical image has its optical path changed by the mirrors 11 so that it enters the lens 12, and the lens 12 focusses the incident optical image upon the image sensor 13. The image sensor 13 is constructed of, for example, three juxtaposed arrays of 1024 photodiodes to thereby read out the information of one line having a width of 256 mm (i.e., the width of B4 paper) with a resolution of 12 dots/mm. On the other hand, the image sensor 13 may use another type of photoelectric converting element such as CCD.

The picture image information of the original is fed consecutively line by line to the image sensor 13 until it is fed out as a continuous picture image electrical signal. This continuous picture image electrical signal is fed to a thermal recording head through a suitable picture signal processing circuit or the like, as will be described hereinafter.

At the lower righthand corner of the copying machine 1, there is detachably arranged a recording paper supply cassette 14, in which sheets of recording paper 15 are arranged in a stacked form. A feed roller 16 contacts with the uppermost sheet of the stack of the sheets of recording paper so that it consecutively feeds out the recording paper sheets 15 one by one. The recording paper sheets 15 are fed by the automatic feed roller 16 into the nip between a registering roller 17 and a pitch roller 18 facing the former. The automatic feed roller 16 is driven through means such as a belt by a feeding step motor 19. This driving power transmission system is similar to that of the step motor for driving the aforementioned read unit.

On the other hand, the aforementioned registering roller 17 acts to make the recording paper sheet 15 stand by at a suitable position. When the recording paper sheet 15 passes through the nip between the registering roller 17 and the pitch roller 18 and further through a registration sensor 20, the automatic feed roller 16 is disengaged from the feeding step motor 19 by the action of an electromagnetic clutch (CL in FIG. 3). As a result, the subsequent conveyance of the recording paper sheet 15 is performed by the registering roller 17. After the recording paper sheet 15 has passed, a sequence control circuit (as will be describe hereinafter) counts the number of pulses corresponding to the stepwise operations of the feeding step motor 19 and deenergizes the step motor at the time when the recording paper sheet 15 reaches a back roller 21, to interrupt the rotational motions of the registering roller and thereby hold the recording paper sheet 15 at that position. After that, that recording paper sheet 15 is conveyed together with an ink donor web 22 along the back roller 21.

The ink donor web 22 is prepared by applying a melting pigment to one side thereof which is to be brought into contact with the recording paper sheet 15. The donor web 22 thus prepared is supplied from a donor web supply roll 23 and passes along the circumference of the back roller 21 and around a donor web feed roller 24 until it extends to a donor web take-up roller 25. The take-up operation of that ink donor web is performed by an ink donor web step motor 26. More specifically, the drive force of the step motor 26 is transmitted through suitable means such as a belt to an idler 27. Since this idler 27 is coupled to the donor web feed roller 24 which is in contact with the back roller 21, the back roller 21 is stepwise driven. The step motor 26 operates at first immediately before the recording paper sheet 15 reaches the back roller 21 so that the ink donor web 22 and the recording paper sheet 15 may be conveyed together by the action of the back roller 21. This is intended to avoid wasteful comsumption of the ink donor web.

On the opposite side of the ink donor web 22 from the side facing the back roller, a thermal recording head 28 is so arranged that it holds the ink donor web between the head 28 and the back roller. The thermal recording head 28 is formed into such a slender shape that a number of heating elements are juxtaposed in a direction to intersect the moving direction of the donor web to thereby thermally record the recording paper sheet 15 with the information of one line, which has been read out by the image sensor 13. Since the simultaneous energization of those heating elements requires a power source having a large capacity, the heating elements are grouped into a predetermined number of blocks, and the elements are energized on a block-by-block basis so as to reduce the size of the power source. By way of example, the heating elements of 1728 dots are grouped into four blocks each having 432 dots at an interval of 6 to 8 dots/mm, so that the blocks are consecutively energized one by one to thereby effect the image formation. This control of energization is easily performed by means of a diode matrix or the like.

In the energization of the heating elements of the thermal recording head, moreover, the energization width (the number of elements in the width direction) is controlled in accordance with the width of the recording paper used to thereby eliminate waste in the power consumption and to prevent the detrimental transfer of ink to the back roller 21. Moreover, the ratio of the black information in one line to be recorded is calculated, and, in case it exceeds a predetermined ratio (e.g., 25%), the aforementioned number of the blocks into which the elements are divided is increased (e.g., from four to eight or sixteen blocks) to thereby control the energization of the heating elements. Thus, the power source of the thermal recording head need not have its capacity increased even in the case of a high percentage of black information.

In the moving passage of the ink donor web, there are arranged both an automatic balancing roller 29 for smoothing the ink donor web and an idler 30 for holding constant the feed angle of the recording paper sheet. The idler 30 may preferably be arranged at a position for the web to make such an angle that the recording paper sheet 15 is smoothly fed to the back roller 21. The recording paper sheet 15 is separated downstream of the roller 24, after having been thermally recorded, so that it is fed out into a discharge tray 31, in which it is stacked. On the other hand, the ink donor web is taken up through an idler 32 upon the take-up roller 25. This take-up roller 25 is equipped with a slip clutch, which is driven by the idler 27 to thereby slide and drive the take-up roll 25.

The replacement of the supply roll 23 and the take-up roll 25 can be simply performed by rocking the idling portion (not shown), which is attached in a rockable manner to the frame of the copying machine, so that the platen 2 is swung upward together with the platen cover 3 to thereby allow an easy access.

Figure 2:
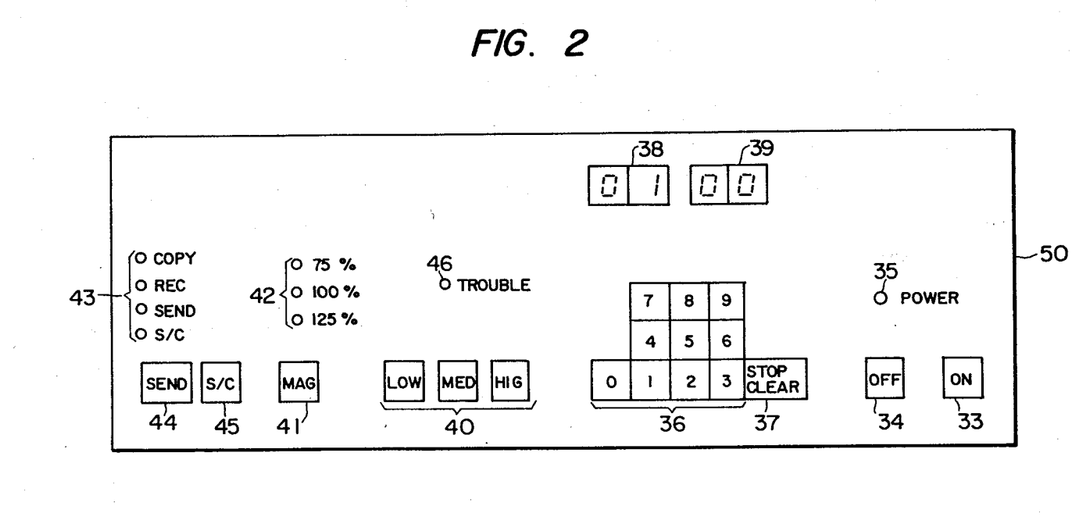
FIG. 2 is a schematic view showing the operation panel of the copying machine of FIG. 1.

FIG. 2 shows the operational panel 50 of the copying machine of FIG. 1. Reference numerals 33 and 34 indicate ON and OFF switches of the power source, respectively. When the ON switch 33 is depressed, a power indicator 35 is lit to inform the operator of the fact that the copying machine is brought into an operative state. A copy number selecting button 36 is provided to set the desired copy number, and the set number is displayed in a set counter 38. In case the once set copy number is to be changed, it is sufficient to depress a STOP CLEAR button 37 and to newly depress the copy number of selecting button 36. In order to display the number of copies made, on the other hand, there is also provided an output counter 39. Buttons 40 are copy density selection and start switches, by which one of low (LOW), medium (MED) and high (HIG) densities is selected in accordance with the density from the original so that the copying operation is started. In order to set the magnification of the copy, moreover, there is also provided a magnification setting button 41, which consecutively changes the magnification among 75%, 100% and 125%, each time it is depressed, upon which a magnification indicator 42 disposed thereabove is lit. A mode indicator 43 is also provided to display the mode of the copying machine and usually has only its COPY lamp lit to indicate that the usual copying operation is to be performed. Upon reception of a request signal from the outside, a REC lamp is lit so that the picture image signal from the outside is received to form an image on the recording paper. A SEND button 44 is a transmission button for transmitting the picture image signal so that, if it is depressed, a SEND lamp is lit to transmit the picture image signal, which has been read out by the image sensor, to the outside. An S/C button 45 is a button for simultaneously effecting the transmitting and copying operations so that, if it is depressed, a lamp S/C is lit partly to feed out the picture image signal read out and partly to simultaneously form an image of the picture image signal on the recording paper. An indicator 46 is lit when a malfunction such as jamming takes place in the copying machine, and is extinguished if the STOP CLEAR button is depressed after the malfunction has been repaired.

Figure 3:
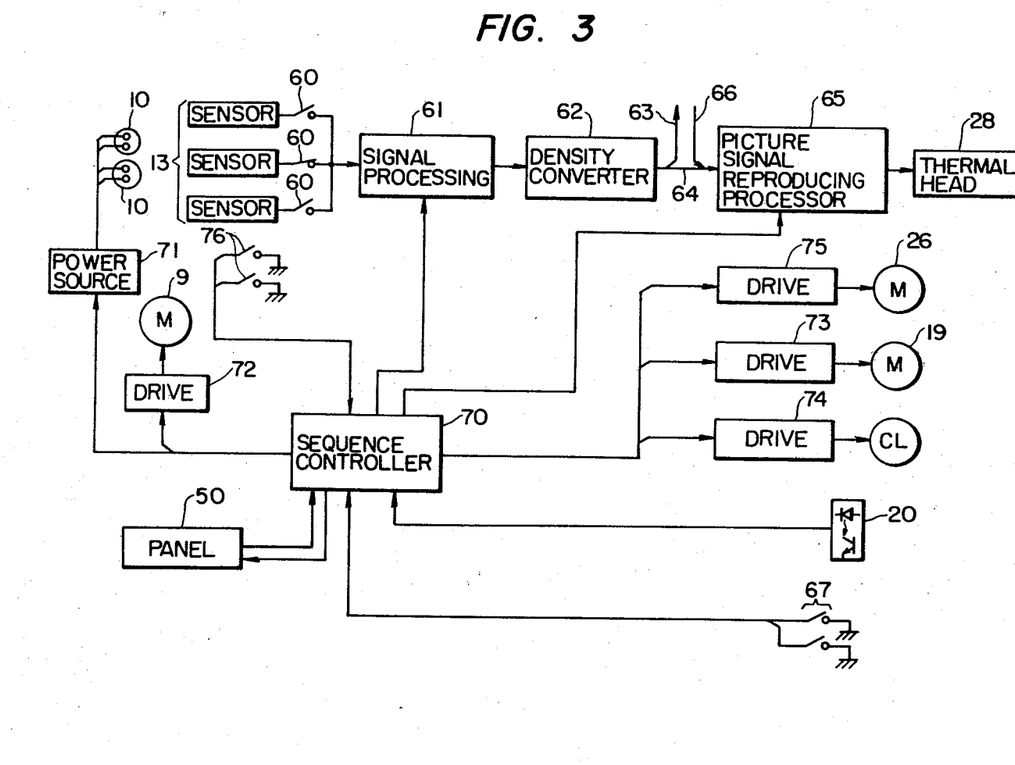
FIG. 3 is a block diagram showing the circuit of the copying machine of FIG. 1.

FIG. 3 is a circuit diagram of the copying machine of FIG. 1, and this circuit may be disposed either in the copying machine or in another casing for the purpose of size reduction. Reference numeral 13 indicates the image sensor shown in FIG. 1. In this circuit diagram, the image sensor is equipped with three blocks of light receiving elements, and there are provided switches 60 for consecutively switching those three blocks. Analog switches, for example, are used as the switches 60. The series picture image signals, which are read out by the image sensor 13, are fed to a picture signal processing circuit 61. In this picture signal processing circuit, the picture image signals are filtered of the noises (or the background) by compensating and processing the background, and these signals are then converted into binary signals of white and black. Moreover, the picture signal processing circuit is made to have a white line skipping function for skipping the reading of a line to be subsequently read in case that line is wholly white. For this white line skipping function, it is preferable that a sensor array be used which is capable of simultaneously reading out at least two lines.

Figure 4:
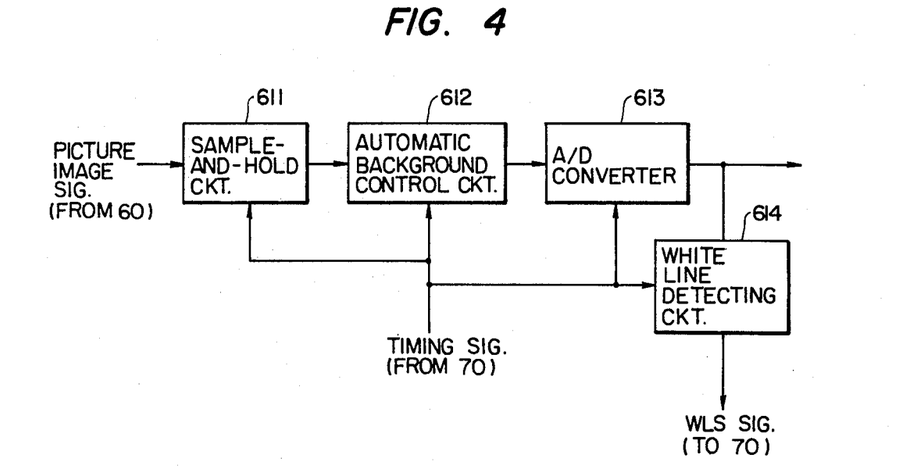
FIG. 4 is a block diagram of the signal processing circuit of FIG. 3.

The picture signal processing circuit 61 will be described in more detail with reference to FIG. 4. The picture signal processing circuit 61 includes a sample-and-hold circuit 611, an automatic background control circuit 612, an A/D converter 613, and a white line detecting circuit 614. Each of the circuits per se is known in the art. The series picture image signal read out by the image sensor 13 is fed to the sample-and-hold circuit 613 from which a sampled signal is outputted. The sampled signal is applied to the automatic background control circuit 612 where color basis compensation of the original and light quantity compensation of the light sources 10 are implemented so that the output signal from the control circuit 612 has a uniform amplitude irrespective of the color of the original to be used. The output signal from the circuit 612 is applied to the A/D converter where the analog signal is converted into a digital signal of either binary, base eight, or hexadecimal notation depending upon the required number of gradations, anything more than binary notation enabling half tone generation. E.g., if the output of converter 613 is only binary, it can only represent white or black. If it is more than binary, intermediate or half-tones can be represented. Half-tones can then be easily produced, e.g. by energizing only every other heat generating element in any area of the image where an intermediate tone was detected. The white line detecting circuit 614 detects a whole white line in response to the timing signal fed from the sequence controller 70 and outputs a white line skipping signal WLS to the sequence controller 70. This saves the trouble of controlling block numbers, rearranging data, etc., and the recording paper can merely be advanced one line with no complex signal processing.

The output of the picture signal processing circuit 61 is fed to a line density converter 62, which has a function to convert the picture image signals, which are read out with resolution of 12 dots/mm by the image sensor 13, in accordance with the magnification selected. The conversion is made such that the 12 dots are reduced to the 8 dots/mm spacing of the heating elements when the magnification is 100% (i.e., 1:1), such that the 12 dots are reduced to 6 dots when the magnification is 75% (i.e., a size reduction of ¾), and such that the 12 dots are reduced to 10 dots when the magnification is 125% (i.e., the size enlargement of 5/4).

Figure 5:
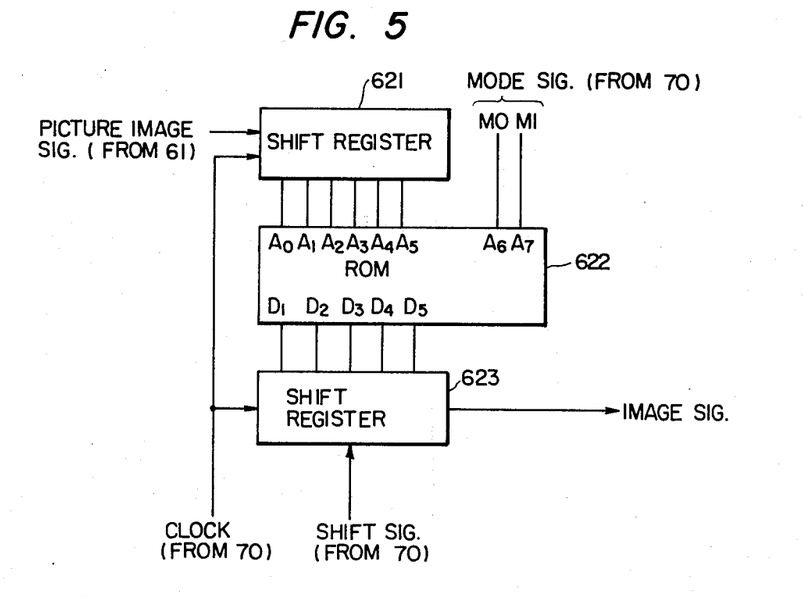
FIG. 5 is a block diagram of the density conversion circuit of FIG. 3.

The line density converter 62 will be described in more detail with reference to FIG. 5. The line density converter 62 includes a first shift register 621, a ROM (read only memory) 622 and a second shift register 623. The first shift register 621 receives the serial picture image signal which is subjected therein to a time division so as to provide, e.g., a 6-bit parallel signal. The 6-bit parallel signal and a 2-bit mode signal fed from the sequence controller 70 and representing the magnification factor are applied to the ROM 622 where the 6-bit signal is converted into either a 5-bit signal, 4-signal or 3-bit signal corresponding respectively to 125%, 100% and 75% magnification. The second shift register 623 operates to convert the applied parallel signal into a serial signal.

Thus, the line density converter feeds out the series binary picture signals. These series binary picture signals can be transmitted to an external receiver as in a facsimile transmitter, and for this purpose an external transmission line 63 is provided. This line may be a telephone circuit, a communication circuit in a company or a radio, for example. Independently of the line 63, the output of the line density converter 62 is directly connected through a line 64 to a picture signal reproducing processor 65. The lines 63 and 64 are selected in accordance with the mode of the copying machine such that no output is fed out to the line 63 when the COPY lamp of the indicator 43 is lit, such that no output is fed out to the line 64 when the SEND lamp is lit, and such that the output is fed out simultaneously to the lines 63 and 64 when the S/C lamp is lit.

The picture signal reproducing processor 65 is equipped with a synchronizing signal generator similar to a facsimile receiver. As a result, the picture signal reproducing processor 65 can also receive picture image signals from an external line 66. The selection of those lines 64 and 66 is interchanged in accordance with the mode of the copying machine similarly to the selection between the lines 63 and 64. For example: when the COPY lamp is lit, the line 64 is selected; when the REC lamp is lit, only the line 66 is selected; when the SEND lamp is lit, both the lines are disconnected; and when the S/C lamp is lit, only the line 64 is selected.

The picture signal reproducing processor 65 has a function to rearrange the picture signal data in a manner to correspond to the scanning direction of the read unit. More specifically, the read unit 4 can move back and forth, as has been described hereinbefore, and it can read out the picture image signals not only during forward movement but also during backward movement in the present invention. Therefore, since, if the reading order during the forward movement is assumed to be a forward one, the order during the backward movement is a backward one, it becomes necessary to rearrange the data of those lines on a line-by-line basis, and the signal reproducing processor 65 performs that function. Needless to say, this function is peculiar to the backward scanning step and can be dispensed with during the forward scanning operation or when the data from the external line 66 is to be received.

On the other hand, the picture signal reproducing processor 65 is equipped with a series-parallel converter for converting the series picture signals into parallel signals, whereby data for one line or block are prepared.

Figure 6:
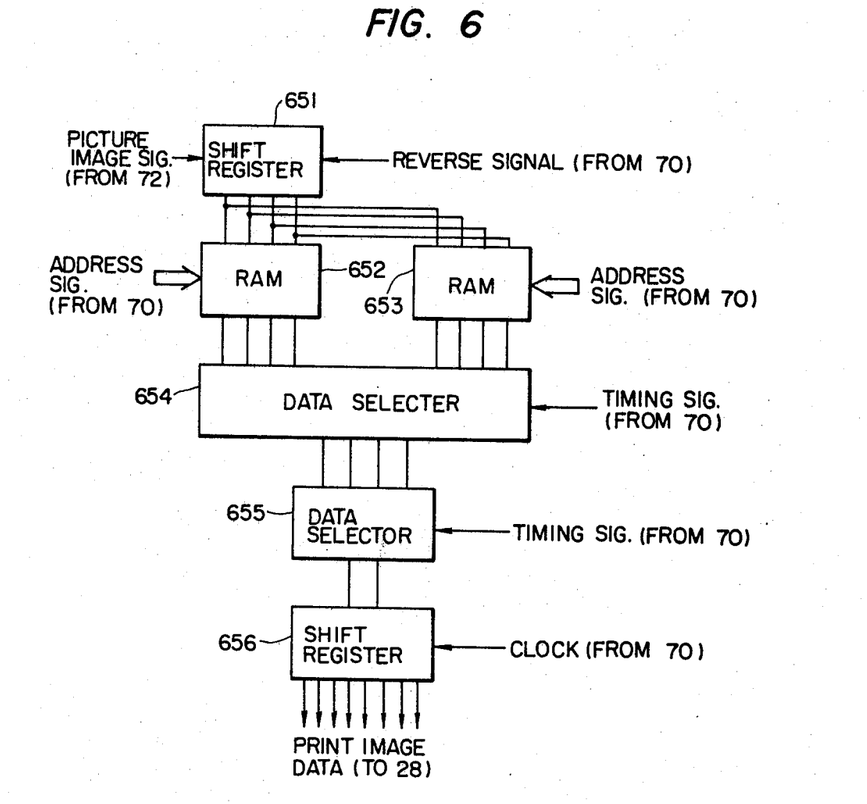
FIG. 6 is a block diagram of picture signal reproducing processor circuit of FIG. 3.

The picture signal reproducing processor 65 will be more fully understood with reference to FIG. 6 in which are included a first shift register 651, a first RAM (random access memory) 652, a second RAM 653, a first data selector 654, a second data selector 655, and a second shift register 656. The serial picture image signal is applied to the first shift register 651 in which the serial signal is converted into a parallel signal adapted to be applied to the RAMs 652 and 653. The operation of the first shift register 651 is controlled in response to a reverse signal fed from the sequence controller 70. Specifically, in the case when the reverse signal is indicative of the forward movement of the reader, the parallel signal is produced from the first shift register 651 in a normal order. In the case when the reverse signal is indicative of the backward movement of the reader, the parallel signal is produced in a reversed order. This can be easily accomplished with simple internal logic.

Assuming that the shift register 651 holds less than an entire line of data, further rearrangement is necessary. For example, in the reverse movement direction, the lines will be scanned in reverse order but each line will itself be scanned in the proper direction. A proper image could be achieved by reading out the lines in reverse order, but this would require storage of a complete page of data. Instead, the present invention leaves the lines in reverse order and al reverses the data of each line so that the image will be reproduced on the recording paper in the proper relationship. For example, if a document includes 5 lines of picture elements at 4 elements per line, i.e.,

| A1 | A2 | A3 | A4 |
| B1 | B2 | B3 | B4 |
| C1 | C2 | C3 | C4 |
| D1 | D2 | D3 | D4 |
| E1 | E2 | E3 | E4 | and assuming the normal movement direction is top-to-bottom and scanning direction of each line is left-to-right, then with the same scanning operation but reverse movement direction the image would be printed:

| E1 | E2 | E3 | E4 |
| D1 | D2 | D3 | D4 |
| C1 | C2 | C3 | C4 |
| B1 | B2 | B3 | B4 |
| A1 | A2 | A3 | A4 |

Rather than reverse the order of lines, the data for each line can be reversed to yield

| E4 | E3 | E2 | E1 |
| D4 | D3 | D2 | D1 |
| C4 | C3 | C2 | C1 |
| B4 | B3 | B2 | B1 |
| A4 | A3 | A2 | A1 |

Then, by merely turning the paper around 180°, the image elements will also be in their proper positions, so that image recording can be performed and the paper need only be turned around after it is discharged from the machine.

If, now, the shift register only holds two image elements, for example, then reversal of the first two elements of the line E1-E2-E3-E4 will result in E4-E3 and subsequent reversal of the second two elements will yield E2-E1. The sequence of data read out of the shift register 651 for that line will then read E2-E1-E4-E3 and must be further rearranged to achieve the desired E4-E3-E2-E1. This is performed in the memories 652 and 653. These RAMs operate in a ping-pong fashion, with RAM 652 storing the data for one line, then RAM 653 storing the data for the next line while the first line of data is read out in rearranged format from RAM 652, and so forth. The first data selector 654 selects the output from the RAM which is not currently being written into, and this data is then used to control the heat generating elements.

If desired, the data from selector 654 can be further selected by optional data selector 655. For example, it is known to permit energization of only non-adjacent heat generating elements, and the selector 655 could therefore separate the data into separate groups, e.g. even and odd. This selector, however, would probably not be necessary if, as suggested above, a diode matrix is used to control the energizing groups of the heat generating elements.

If desired also, shift register 656 can be provided to accumulate data read serially out of the memories 652 or 653 so that larger quantities of heat generating elements, or more importantly quantities that are spread over a larger area of the line, can be energized. The shift register 656 may, e.g., provide 8-bit parallel signals to the thermal head through a diode matrix if one is to be used.

In any event, the image data is then supplied through a diode matrix to the heat generating elements. Diode matrices are vey well known and the particular matrix used herein would depend on the type of grouping desired by the machine user, and the details of such a matrix would be well within the skill of the ordinary artisan. Accordingly, no detailed illustration is believed to be necessary.

In the vicinity of the cassette 14, on the other hand, there is provided a switch 65 for detecting size (e.g., A4, B4 or the like) of the recording paper. There is also provided a circuit for controlling the recording width of the thermal recording head 28 in accordance with the signal of that switch 67. This signal from switch 67 can also be used to limit the range of movement of the read unit. In the circuit 65, still further, there are included both a diode matrix for controlling the heating elements of the aforementioned head 28 block by block, and a block control circuit for increasing and decreasing the aforementioned block number. As a result, the output of the picture signal reproducing processor selectively energizes the heating resistors of the thermal recording head 28 and heats the ink donor web 22 to thereby form the image on the recording paper sheet 15.

A circuit 70 is a sequence controller, which sequentially controls: a power source 71 for lighting the light sources 10 of the iamge read unit; a drive circuit 72 for energizing the read unit driving step motor 9; a drive circuit 73 for energizing the step motor 19 for moving the recording paper sheet forward; a drive circuit 74 for energizing an electromagnetic clutch CL which is operative to connect and disconnect the feed roller 16 and the step motor 19; a drive circuit 75 for energizing the step motor 26, which is operative to drive the feed roller 24 and the back roller 21 through the idler 27; and the indicator of the panel 50. This circuit 70 also controls the timing of the picture image signals of the picture signal processing circuit 61. The sequence control circuit 70 controls the copying operations in response to both the command from the operating panel 50 and the signal coming from a detecting switch 76 for detecting whether or not the recording paper size detecting switch 67, the registration sensor 20 of the recording paper, and the read unit 4 are at their home positions. The sequence control circuit 70 is broadly divided into a timing generation circuit and a sequence control part. The timing generation circuit generates clock pulses to be applied to a CPU contained in the sequence control circuit, the image sensor, and the thermal head, and further generates synchronizing signals. The sequence control part operates to control the monitor of operation panel, the light sources and, driving of the motors and clutches. The details of the sequence control are well known and in any event will be obvious to the ordinarily skilled artisan. These sequence controls will be made more apparent from the following description directed to the operations of the copying machine.

The operation of the copying machine of the present invention is as follows. It is assumed that the indicator of the operating panel has its COPY lamp lit. If one of the buttons 40 is depressed, the sequence control circuit 70 partly energizes the power source 71, after having confirmed that the copying machine is at its operative state, to thereby light the light sources 10. It also partly energizes the drive circuit 72 to thereby drive the step motor 9 so that the read unit 4 is set at its home position. Then, the sequence control circuit 70 confirms that the read unit is set at the home position by means of the switch 76. At this time, unless the signal from the switch 76 arrives for a predetermined time period, the copying machine is stopped, and the indicator 46 is lit to indicate trouble.

The sequence control circuit 70 energizes the drive circuit 73 to thereby drive the step motor 19 so that the recording paper sheet 15 is continuously fed out of the cassette 14 by the action of the feed roller 16 until it reaches the registering roller 17 and the registration sensor 20. When the registration sensor 20 detects the recording paper sheet 15, the electromagnetic clutch CL operates so that the registering roller 16 is driven to feed out the recording paper sheet 15, and the sequence control circuit 70 begins counting the pulses corresponding to the stepwise operations of the step motor 19 to thereby stop the sheet 15 at the time when the sheet reaches the back roller 21.

Next, the read unit driving step motor 9 operates so that the read unit 4 is moved forward to stepwise scan the original, whereby the image sensor 13 of the read unit 4 reads out the original line by line. The picture image signals from that image sensor are fed through the circuits 61, 62 and 65 to the thermal recording head 28. Before the recording operation is started by the thermal recording head 28, the step motor 26 operates so that the recording paper sheet 15 and the ink donor web 22 are registered under their contacting condition with the thermal recording head by the action of the back roller 21, while leaving a predetermined blank margin in the recording paper sheet, thus finishing the preparation for the recording operation. In response to the picture image signals fed to the thermal recording head 28, the recording paper sheet 15 is then recorded with the information for each line. The feed speed of the back roller 21 at this time differs in accordance with the copying magnification ratio, e.g. set by 75%:100%:125%=3:4:5.

The recorded sheet is discharged to the discharge tray 31, whereas the ink donor web is taken up on the take-up roll 25. In the case of only one-sheet copy, the read unit is quickly returned to its home position. In the case of multiple-sheet copying, the copying operations are performed in the backward stroke, too. Since, in this case, the direction read by the image sensor 13 is opposite to that in the case of the forward stroke, the data read by the image sensor 13 are recorded as an inverted image if they are fed out to the thermal recording head as they are. Therefore, this is corrected by the one-line data rearranging function of the picture signal reproducing processor 65, and the data are then recorded on the sheet. Incidentally, since the recording paper, which has the image formed by the data read out in that backward stroke, has its recorded image inverted from that of the recording paper in the forward stroke, a suitable direction changing device of the recording paper sheet may preferably be disposed upstream of the recording paper sheet discharge tray.

Although the foregoing description is directed to the operations of the copying machine in the COPY mode, the remaining operating modes can be easily understood from that description. For example: in the REC mode, the image reading operation is not performed, but only the recording operation is performed; in the SEND mode, on the contrary, only the image reading operation is performed, but the recording operation is not performed: and in the S/C (COPY/SEND) mode, the copying operation is performed, and the picture image signals are simultaneously transmitted from the line 63.

A more detailed description and illustration of the internal circuits of the various above-described components is not believed to be necessary for a full understanding of the invention. Scanning-type image sensors and image signal enhancement are well known. Also well known is the operation of a thermal printing head in accordance with picture signal information. The two features have not before been combined to form a copying machine, however. Further, the density conversion is very straightforward, and the reversal of each line of data during reverse scanning is an easy data manipulation well within the skill of the ordinary artisan.

As will now be understood from the foregoing description, according to the present invention, there is provided a copying machine which makes it possible to copy a number of sheets although its power consumption rate is low and its construction is simple. Moreover, the copying machine can perform not only the copying operations but also the communication with an external devices so that the composition, deletion, transfer and the like of a picture images can be performed.

What is claimed is:

1. A thermal recording type copying machine, comprising:
    a platen for arranging an original thereon, said original having image information thereon;
    a read unit for reading the image information of the original during relative movement of said platen and read unit and for converting the read image into electrical picture signals;
    a stationary thermal recording head having heating elements for generating heat in accordance with said electrical picture signals;
    conveying means for conveying an ink donor member and a sheet of cut paper in juxtaposition to each other, while being in close contact under pressure, past said heating elements of said thermal recording head; and
    means for separating only said cut paper having an image recorded thereon from said ink donor member and for discharging said cut paper in a stacked fashion.

2. A copying machine as set forth in claim 1, further comprising an output terminal providing said electrical signals externally of said copying machine so that picture signal processing operations such as the composition or deletion of picture image portions may be performed externally of said copying machine, and input terminal and means for receiving said externally processed signals for application to said thermal recording head.

3. A copying machine as set forth in claim 1, further comprising means for determining the width of the original and means for controlling the total width of energized heating elements in accordance with the width of said original.

4. A copying machine as set forth in claim 1, further comprising means for determining the size of said original and means for moving said read unit during a copying operation by an amount corresponding to the determined original size.

5. A copying machine as set forth in claim 1, wherein said copying machine has a variable magnification value, said conveying means conveying said ink donor member and paper sheet past said thermal recording head at a speed corresponding to said magnification value.

6. A copying machine as set forth in claim 1, wherein said ink donor member comprises a web to be conveyed from a supply roll to a take-up roll.

7. A copying machine as set forth in claim 6, wherein said platen is in the form of a transparent plate which is movable to thereby expose the interior of said machine for replacement of said ink donor supply roll and take-up roll.

8. A copying machine as set forth in claim 1, further comprising picture signal processing means for converting said electrical picture signals into binary signals.

9. A copying machine as claimed in claim 8, wherein said picture signal processing means converts said electrical picture signals to digital signals by comparing said picture signals to threshold levels, said picture signal processing means selectively using a plurality of different threshold levels for achieving half-tone reproduction.

10. A copying machine as set forth in claim 1, wherein said image information is read line-by-line, said machine further comprising a processor for processing said electrical picture signals, said processor skipping the processing of any line of picture signals having no image information.

11. The copying machine as set forth in claim 10, wherein said processor produces a white line signal when no image information is produced by said read unit during the scanning of an entire line of said image information, said white line signal automatically causing said conveyor means to increment said cut paper by one line.

12. A copying machine as set forth in claim 1, further comprising means for effecting enlargement and reduction.

13. A copying machine as set forth in claim 12, wherein said read unit converts said image information into electrical picture signals with a resolution of X picture signal dots per mm of original image information and said heating elements are energized at a spacing of Y elements per mm, and said enlargement or reduction are effected by varying said spacing Y.

14. The copying machine as set forth in claim 13, wherein said electrical picture signals having a resolution of X picture signal dots/mm are converted into electrical picture processing signals having a resolution of Y picture signal dots/mm, said electrical picture processing signals being received by said thermal recording head to energize said heating elements.

15. The copying machine as set forth in claim 14, wherein said read unit includes a first shift register for converting said electrical picture signals into a parallel address signal, a ROM, said ROM receiving said parallel address signal and a selection signal to convert said parallel address signal into a parallel output signal, and a second shift register for converting said parallel output signal into said electrical picture processing signals.

16. A copying machine as set forth in claim 1, wherein said thermal recording head includes a plurality of blocks of heating elements and energizing means for energizing said heating elements, each said block including a plurality of heating elements, and wherein said energizing means energizes heating elements only within one of said blocks at any one time.

17. A copying machine as set forth in claim 16, wherein said energizing means varies the number of elements within each block in accordance with the density of said image information.

18. A copying machine as set forth in claim 1, wherein said read unit reads said image information during both backward and forward movements of said read unit, said machine further comprising a picture signal processor receiving said electrical picture signals and rearranging the picture signals derived during a backward stroke of said read unit in the copying operation of said copying machine, to thereby permit copying operation during both the forward and backward strokes.

19. The copying machine as set forth in claim 13, wherein said picture signal processor comprises a shift register, said shift register receiving said image information from said read unit and outputting said information in a first parallel form during a forward stroke of said read unit and outputting said information in a second parallel form during a backward stroke of said read unit, said first and second parallel forms being opposites of each other.

20. The copying machine as set forth in claim 19, further comprising a first RAM for storing said information from said shift register of said first parallel form, a second RAM for storing said information from said shift register of said second parallel form, a first data selector for reading out said first and second RAMs, said data selector reading out said first RAM during a backward stroke of said read unit and reading out said second RAM during a forward stroke of said read unit.

21. The copying machine as set forth in claim 20, further comprising a second data selector receiving the output of said first data selector, said second data selector separating said information to form a plurality of separate data groups.

* * * * *